United States Patent
Zhang et al.

(10) Patent No.: US 10,209,437 B2
(45) Date of Patent: *Feb. 19, 2019

(54) SINGLE-MODE OPTICAL FIBER WITH ULTRA LOW ATTENUATION AND LARGE EFFECTIVE AREA

(71) Applicant: YANGTZE OPTICAL FIBRE AND CABLE JOINT STOCK LIMITED COMPANY, Wuhan, Hubei (CN)

(72) Inventors: Lei Zhang, Hubei (CN); Jihong Zhu, Hubei (CN); Shengya Long, Hubei (CN); Jun Wu, Hubei (CN); Ruichun Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,243

(22) Filed: Jan. 9, 2018

(65) Prior Publication Data
US 2018/0128968 A1    May 10, 2018

Related U.S. Application Data

(63) Continuation of application No. PCT/CN2015/096106, filed on Dec. 1, 2015.

(30) Foreign Application Priority Data

Jul. 31, 2015  (CN) .......................... 2015 1 0464355

(51) Int. Cl.
G02B 6/02    (2006.01)
G02B 6/036   (2006.01)

(52) U.S. Cl.
CPC ..... *G02B 6/03683* (2013.01); *G02B 6/02009* (2013.01); *G02B 6/02019* (2013.01);
(Continued)

(58) Field of Classification Search
None
See application file for complete search history.

(56) References Cited

U.S. PATENT DOCUMENTS 5,146,534 A * 9/1992 Lines ............... C03C 13/045
                                                      385/142
6,917,740 B2   7/2005 Boek et al.
(Continued)

FOREIGN PATENT DOCUMENTS

CN    102603179 A    7/2012
CN    103454719 A    12/2013
(Continued)

OTHER PUBLICATIONS

LANL Periodic Table of Elements—Francium. Retrieved from http://periodic.lanl.gov/87.shtml, May 8, 2018.*
(Continued)

*Primary Examiner* — Michael Stahl
(74) *Attorney, Agent, or Firm* — Tim Tingkang Xia, Esq.; Locke Lord LLP

(57) ABSTRACT

An optical fiber with ultra-low attenuation and large effective-area includes a core layer and cladding layers. The cladding layers have an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The core layer has a radius of 4.8-6.5 μm, and a relative refractive index difference of −0.06% to 0.10%. The inner cladding layer has a radius of 9-15 μm, and a relative refractive index difference of about −0.40% to −0.15%. The trench cladding layer has a radius of about 12-17 μm, and a relative refractive index difference of about −0.8% to −0.3%. The auxiliary outer cladding layer has a radius of about 37-50
(Continued)

μm, and a relative refractive index difference of about −0.6% to −0.25%. The outer cladding layer is a pure silicon-dioxide glass layer.

8 Claims, 1 Drawing Sheet

(52) U.S. Cl.
CPC ......... *G02B 6/02333* (2013.01); *G02B 6/036* (2013.01); *G02B 6/03661* (2013.01)

(56) References Cited

U.S. PATENT DOCUMENTS

| | | | |
|---|---|---|---|
| 7,088,900 B1 | 8/2006 | Mishra | |
| 9,874,687 B2* | 1/2018 | Long | G02B 6/03683 |
| 2005/0063663 A1* | 3/2005 | Anderson | C03B 37/01211 |
| | | | 385/142 |
| 2007/0003198 A1* | 1/2007 | Gibson | C03B 37/01211 |
| | | | 385/123 |
| 2010/0195966 A1 | 8/2010 | Bickham et al. | |
| 2010/0195999 A1 | 8/2010 | Kikuchi | |
| 2011/0044595 A1* | 2/2011 | Sillard | G02B 6/02019 |
| | | | 385/124 |
| 2011/0085770 A1* | 4/2011 | Bigot-Astruc | G02B 6/0365 |
| | | | 385/123 |
| 2012/0189262 A1 | 7/2012 | Hirano et al. | |
| 2012/0315006 A1* | 12/2012 | Bigot-Astruc | G02B 6/03666 |
| | | | 385/126 |
| 2013/0071080 A1* | 3/2013 | Peckham | G02B 6/02019 |
| | | | 385/124 |
| 2014/0248026 A1* | 9/2014 | Yang | G02B 6/03605 |
| | | | 385/127 |
| 2014/0254997 A1* | 9/2014 | Tamura | C03B 37/01807 |
| | | | 385/126 |
| 2018/0039019 A1* | 2/2018 | Zhang | G02B 6/03633 |
| 2018/0039020 A1* | 2/2018 | Long | G02B 6/03683 |
| 2018/0052280 A1* | 2/2018 | Zhang | G02B 6/03683 |

FOREIGN PATENT DOCUMENTS

| | | |
|---|---|---|
| CN | 104360434 A | 2/2015 |
| CN | 104765098 A | 7/2015 |
| CN | 104777551 A | 7/2015 |
| CN | 104777553 A | 7/2015 |
| CN | 104991307 A | 10/2015 |
| EP | 2312350 A1 | 4/2011 |
| WO | 2010088482 A1 | 8/2010 |

OTHER PUBLICATIONS

English translation of written opinion for PCT/CN2015/096106, dated Apr. 27, 2016.*
Office Action issued by the State Intellectual Property Office of the Peoples Republic of China dated Jun. 29, 2016 for CN 201510464355.0.
Office Action issued by the State Intellectual Property Office of the Peoples Republic of China dated Jan. 26, 2017 for CN 201510464355.0.
International Search Report (ISR) issued by the State Intellectual Property Office of the Peoples Republic of China dated Apr. 27, 2016 for PCT/CN2015/096106, China.
European Patent Office, "Extended European Search Report for EP Application No. 15 90 0226", The Hague, dated Jul. 12, 2018.

* cited by examiner

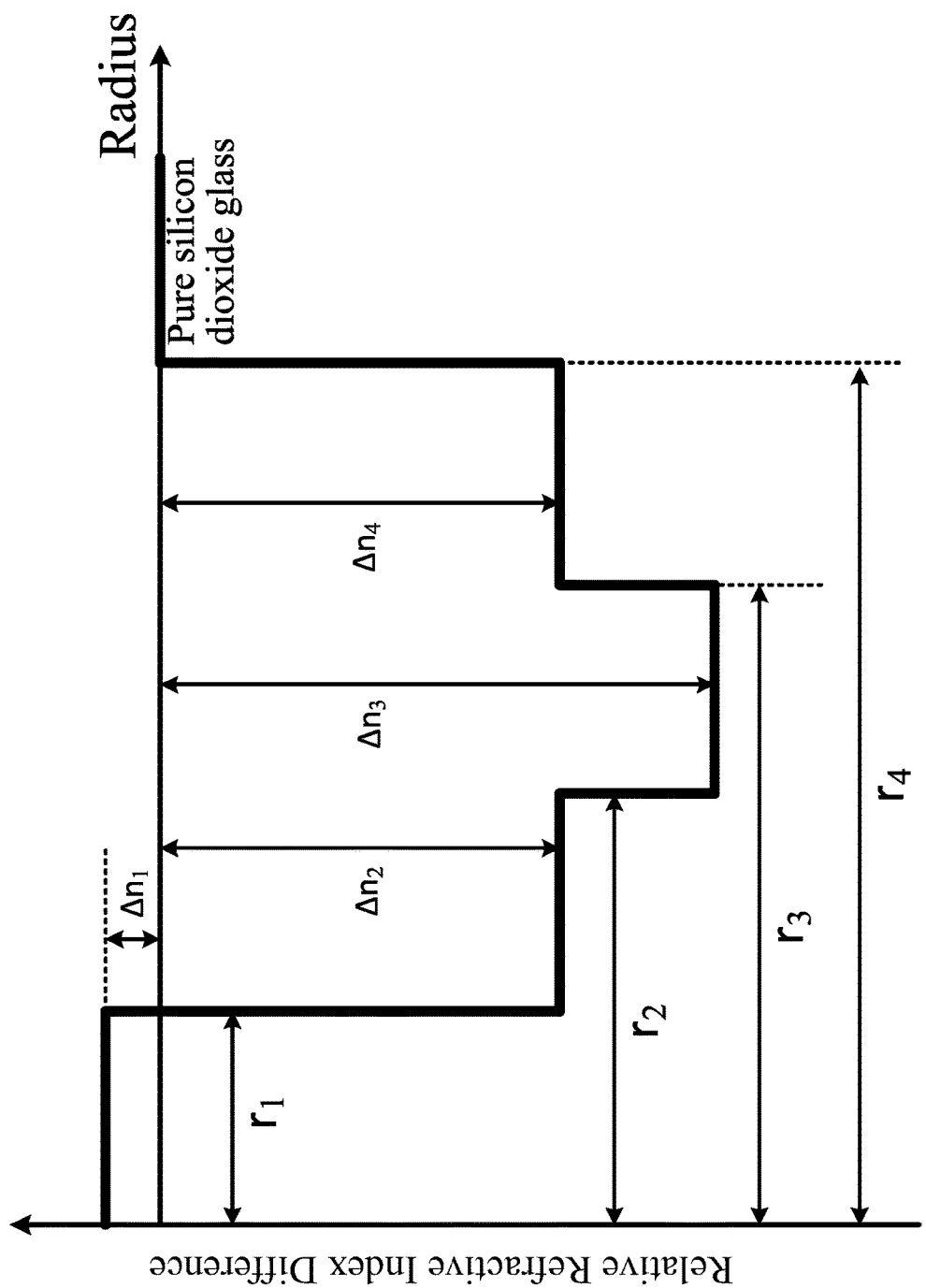

SINGLE-MODE OPTICAL FIBER WITH ULTRA LOW ATTENUATION AND LARGE EFFECTIVE AREA

CROSS-REFERENCE TO RELATED APPLICATIONS

This application is a continuation application of International Patent Application No. PCT/CN2015/096106, filed Dec. 1, 2015, which itself claims priority to Chinese Patent Application No. 201510464355.0, filed Jul. 31, 2015 in the State Intellectual Property Office of P.R. China, which are hereby incorporated herein in their entireties by reference.

FIELD OF THE INVENTION

The present invention relates generally to an optical fiber, and more particularly, to a single-mode optical fiber which has ultra low attenuation and a large effective area.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

As IP network data services grow rapidly, the demands of operators for transmission capacity increase continuously. The capacity of a single optical fiber in the present network has been gradually approaching the limit value 100 Tbps, and the 100 G transmission system has begun to enter the first year of a commercial era. How to further increase the transmission capacity based on the 100 G transmission signal is the focus of attention of each system equipment producer and operator.

Coherent reception and digital signal processing (DSP) technique are adopted for the receiving terminal in 100 G and 100 G beyond systems, which can digitally compensate the dispersion and polarization mode dispersion (PMD) accumulated in the whole transmission process in the electric field; and polarization modes are reused and various high-order modulation modes are adopted to reduce the Baud rate of the signal, such as PM-QPSK, PDM-16QAM, PDM-32QAM, and even PDM-64QAM and CO-OFDM. However, high-order modulation modes are very sensitive to the nonlinear effect, and therefore a higher requirement is put forward for the optical signal to noise ratio (OSNR). Introducing an optical fiber with low loss and large effective area can improve the OSNR and reduce the nonlinear effect for the system. When a high power density system is adopted, the nonlinear coefficient is a parameter used for evaluating the system performance advantages and disadvantages caused by the nonlinear effect, which is defined as $n_2/A_{\mathit{eff}}$, where $n_2$ is the nonlinear refractive index of the transmission optical fiber, and $A_{\mathit{eff}}$ is the effective area of the transmission optical fiber. Increasing the effective area of the transmission optical fiber can reduce the nonlinear effect in the optical fiber.

At present, the effective area of a conventional single-mode optical fiber used for the land transmission system line is only about 80 $\mu m^2$, while the long-distance land transmission system requires a higher effective area of the optical fiber, and generally it is 100 $\mu m^2$ or larger. To reduce the costs for laying and the use of repeaters wherever possible, the effective area of the transmission optical fiber is preferably 130 $\mu m^2$ or larger in the repeaterless transmission system such as a submarine transmission system. However, in the current design for the refractive index profile of the optical fiber with large effective area, a large effective area is often obtained by increasing the diameter of the optical core used for transmitting optical signals. There are some difficulties in the design for such a scheme. On one hand, the basic performance of the optical fiber is primarily determined by the core of the optical fiber and the cladding close to the core, which occupy a large proportion in the manufacturing costs for the optical fiber. If the designed radial dimension is too large, the manufacturing costs of the optical fiber will surely be improved and the price of the optical fiber will also be raised, which will hinder the universal use of such an optical fiber; and on the other hand, compared with a conventional single-mode optical fiber, an increase in the effective area of the optical fiber will result in deterioration of some other parameters, for example, the cutoff wavelength of the optical fiber will increase, but if the cutoff wavelength is too large, then it will be difficult to ensure that the optical signal is under a single mode condition in the transmission waveband of the optical fiber; and in addition, the improper design of the refractive index profile will lead to deterioration of parameters such as bend property and dispersion.

Another optical fiber characteristic that restricts the long distance and high capacity transmission is attenuation. At present, the attenuation of the conventional G.652.D optical fiber is 0.20 dB/km, and the laser energy is reduced gradually after long-distance transmission, so it is necessary to amplify the signal again by using repeaters. In comparison with to the costs for optical fibers and cables, the related equipment and maintenance costs to the repeater station account for 70% or more of the whole link system, so that if a low attenuation or ultra low attenuation optical fiber is involved, then the transmission distance can be extended effectively and the construction and maintenance costs be reduced. According to related calculation, if the attenuation of the optical fiber is reduced to 0.16 dB/km from 0.20 dB/km, the construction cost for the whole link will generally be reduced by about 30%.

To sum up, the development and design of an optical fiber with ultra low attenuation and large effective area becomes an important subject in the manufacturing field of optical fibers. U.S. Publication No. US2010/022533 provides a design of an optical fiber with large effective area, wherein in order to obtain a lower Rayleigh coefficient, the design of a pure silica core is adopted. In such a design, the core is not co-doped with germanium and fluorine, and the fluorine-doped silica is used as the outer cladding. For such a design of a pure silica core, a complicated viscosity matching must be conducted inside the optical fiber, and a very low speed is required in the drawing process, so as to avoid attenuation increase caused by defects inside the optical fiber due to high-speed drawing, so the manufacturing process is extremely complicated.

European Patent No. EP2312350 provides a design of an optical fiber with large effective area and non-pure silica core, wherein a ladder-like sunken cladding structure is adopted for the design, and a pure silicon dioxide outer cladding structure is adopted for another design. The relevant performance can meet the requirements of the optical fiber with large effective area G.654.B and D, but in the design the maximum radius of the fluorine-doped cladding portion is 36 μm, therefore although the cutoff wavelength of the optical fiber can be enabled to be less than or equal to 1530 nm, the micro and macrobend properties of the optical fiber will become poor due to the influence of the small fluorine doping radius, so that in the cabling process of the optical fiber, and the attenuation will increase. In addition, relevant bend properties are not mentioned in the document.

Chinese Patent No. CN10232392 A describes an optical fiber with larger effective area. The effective area of the optical fiber disclosed in the invention reaches 150 μm² or larger, but the conventional design of the core which is co-doped with germanium and fluorine is adopted, and such a design is achieved at the expense of the performance indexes of the cutoff wavelength; the allowable cutoff wavelength of an optical cable is 1450 nm or more, and in the embodiments of the invention, the cable cutoff wavelength even reaches 1800 nm or more. In practical application, if the cutoff wavelength is too large, then it will be hard to ensure that the optical fiber can be cut off at the applied waveband, and unable to ensure that the optical signal is under a single mode condition during transmission. Therefore, a series of practical problems may be faced when such an optical fiber is used. In addition, in the embodiments of the invention, the minimum outer diameter of the sunken cladding $r_3$ is 16.3 μm, which is also too large. The optimal combination of parameters (such as effective area and cutoff wavelength) of the optical fiber and manufacturing costs of the optical fiber is not obtained in the invention.

For the profile design and manufacturing methods of the conventional optical fibers, the core is co-doped with plenty of Ge/F, and in order to obtain the best macrobend performance, the relative refractive index of the core is often greater than 0.35%, i.e., the core is doped with more Ge, and therefore the Rayleigh scattering will be large to result in attenuation increase of the optical fiber.

Chinese Application No. CN201310394404 provides a design of an optical fiber with ultra low attenuation, wherein the design of a pure silicon dioxide outer cladding is used, but because a typical step profile structure is used, a trench cladding design is not used for optimizing the bend properties of the optical fiber, and the core is not doped with Ge, so that a viscosity mismatch phenomenon may occur when the preforming bar is prepared, and therefore the attenuation and bend properties are relatively poor.

The attenuation of a silica optical fiber at 600 nm to 1600 nm is mainly due to Rayleigh scattering, and the attenuation caused by the Rayleigh scattering $\alpha_R$ can be calculated according to the formula below:

$$\alpha_R = \frac{1}{\lambda^4}\int_0^{+\infty} R(r)P(r)rdr \Big/ \int_0^{+\infty} P(r)rdr = \frac{R}{\lambda^4} + B$$

where λ is the wavelength (μm), and R is the Rayleigh scattering coefficient (dB/km/μm⁴); P is the light intensity; and when the Rayleigh scattering coefficient is confirmed, B is the corresponding constant. Therefore, as long as the Rayleigh scattering coefficient R is determined, the attenuation caused by the Rayleigh scattering $\alpha_R$ (dB/km) will be obtained. On one hand, the Rayleigh scattering is caused by density fluctuation, and on the other hand, the Rayleigh scattering is caused by concentration fluctuation, so that the Rayleigh scattering coefficient R can be expressed as:

$$R=R_d+R_c$$

where $R_d$ and $R_c$ respectively represent the changes in the rayleigh scattering coefficient caused by density and concentration fluctuations. $R_c$ is the concentration fluctuation factor, which is mainly affected by the doping concentration of the glass portion of the optical fiber. Theoretically, the less Ge and F or other dopants are used, the smaller $R_c$ will be, which is also the reason why some foreign enterprises now adopt a pure silica core design to achieve the ultra low attenuation performance.

However, we need to notice that the Rayleigh scattering coefficient also includes another parameter $R_d$. The $R_d$ is related to the fictive temperature $T_F$ of glass and varies with the structural and temperature changes of glass. The fictive temperature $T_F$ of glass is a physical parameter representing the structure of glass, and is defined as a temperature corresponding to an equilibrium state reached by the structure of glass without readjustment after the glass is rapidly cooled to room temperature from a certain temperature T'. When T'>Tf (the softening temperature of glass), the structure of glass is easy to adjust because the viscosity of glass is low, thus the glass is in an equilibrium state at every moment, so that $T_F$=T'; when T'<$T_g$ (the transition temperature of glass), the structure of glass is hard to adjust because the viscosity of glass is high, thus the structural adjustment of glass lags behind the temperature change, so that $T_F$>T'; and when $T_g$<T'<$T_F$ (the softening temperature of glass), the time required for the glass to tend to equilibrium is shorter, and is particularly related to the glass components and the cooling speed, so that $T_F$>T' or $T_F$<T'.

If the pure silica core design is used, in order to ensure the total reflection of the optical fiber, an F-doped inner cladding with relatively low refractive index must be used for matching, so as to ensure that there is an enough difference in the refractive indexes between the core and the inner cladding. For such a pure silica core design, the viscosity of the core is higher while that of the inner cladding doped with plenty of F is lower, thus the structural viscosity matching of the optical fiber is imbalanced, and the virtual temperature of the optical fiber with a pure silica core structure increases rapidly, leading to an increase in $R_d$. In this way, not only will the advantages brought by reduction of $R_c$ be offset, but also the reverse abnormalities of the optical fiber attenuation may be caused.

To ensure that the viscosity of the core matches with the viscosity of the outer cladding of the optical fiber with pure silicon dioxide core, we can optimize the viscosity of the core by doping alkali metals into the core. In U.S. Publication No. US2010/0195966A1, the method of adding alkali metals into the core is used, wherein under the condition of maintaining the pure silica core of the optical fiber, the problem of the increase in $R_d$ caused by viscosity mismatch is solved by changing the viscosity of the core of the optical fiber and the time for structural relaxation of the core, thus overall reducing the Rayleigh scattering coefficient of the optical fiber. Although the attenuation of the optical fiber can be reduced effectively by using this method, the process and preparation are relatively complicated, core rods need to be treated in multiple batches, and the requirement for the doping concentration of alkali metals is very high, so that this method is not favorable for large-scale preparation of optical fibers.

Chinese Application No. CN201310394404 provides a design of an optical fiber with ultra low attenuation, wherein the design of a pure silicon dioxide outer cladding is used, but because a typical step profile structure is used, a trench cladding design is not used for optimizing the bend properties of the optical fiber, and the core is not doped with Ge, so that a viscosity mismatch phenomenon may occur when the preforming bar is prepared, therefore the attenuation and bend levels are relatively poor.

U.S. Pat. No. 6,917,740 provides a pure silica core optical fiber of which the performance is improved by utilizing the viscosity changes, wherein the core is doped with plenty of F and Cl, and the contributions of the doped F and Cl to the viscosity of the core are utilized to reduce the Rayleigh coefficient of the optical fiber. Moreover, the optical fiber described in the document does not relate to the profile design, and the core is not doped with Ge.

U.S. Publication No. US2010/022533 provides a design of an optical fiber. In order to obtain a lower Rayleigh coefficient, the design of a pure silica core is adopted. In such a design, the core is not co-doped with germanium and fluorine, and the fluorine-doped silicon dioxide is used as the outer cladding. For such a design of a pure silica core, a complicated viscosity matching must be conducted inside the optical fiber, and a very low speed is required in the drawing process, so as to avoid attenuation increase caused by defects inside the optical fiber due to high-speed drawing, so the manufacturing process is extremely complicated.

For a common ultra low attenuation single-mode optical fiber, the outer cladding is completely doped with F. From the perspective of optical fiber optics, such a design is relatively simple, and as long as the refractive index difference between the outer cladding and the core is ensured, the total reflection requirement of the optical fiber can be met. But at present, there are three main factors limiting the manufacturing costs of the optical fibers with ultra low attenuation: first, the alkali metal doping process of the core requires to precisely control the types and concentration of metal ions, so that the manufacturing cost is high; second, the preforming bar purely doped with F is small, so that the drawing process is complex; and third, the F doping process is used for the optical fiber purely doped with F, so that the manufacturing cost is very high. It is estimated preliminarily based on the current market price that the price of an F-doped tube is 5-8 times that of the pure silicon dioxide tube. According to the calculation based on the preliminary relation that the cost for the F-doped material is 6 times that of the pure silicon dioxide material, if the thickness of the F-doped layer is properly reduced through reasonable process design, the manufacturing cost of the optical fiber will be reduced significantly. If the F-doped material is only used at positions where the optical fiber diameter is from 30 to 80 μm, and the common pure silicon dioxide material is used from 80 to 125 μm, then the material cost for such a design will be reduced by 40% when compared with the cost for the traditional optical fiber with ultra low attenuation completely doped with F; and if the F-doped material is used from 30 to 60 μm, and the common pure silicon dioxide material is used from 60 to 125 μm, then the material cost will be reduced by 65%.

Through the above analyses, we can find that the process design of an optical fiber with ultra low attenuation by using a non-pure silica core and a partially fluorine-doped cladding is feasible. However, due to the influence of the first two limiting factors, how to control the optical parameters of the optical fiber under such a design is the final challenge faced by us.

If the pure silicon dioxide that is not doped with fluorine is used as the outer cladding material, there will be three problems.

First, restraint of fundamental mode cutoff: the refractive index difference between the outer cladding material and the core material is too small, so the fundamental mode leakage of the optical fiber will be caused, and the attenuation of the optical fiber will be influenced. Therefore, for the ultra low attenuation fiber designed by using the outer cladding material not doped with F, the fundamental mode leakage must be restrained at the middle position between the outer cladding and the core through reasonable fiber profile design.

Second, consideration of viscosity matching: if no viscosity optimization design is conducted for the outer cladding material, the viscosity will mismatch with the viscosity gradient of the inner cladding and the core, so we control the viscosity of the core by doping with alkali metal ions; and optimize the external glass viscosity of the core through different fluorine doping concentrations of the inner cladding and the trench cladding, so as to reduce problems such as defects at interface positions and virtual temperature rise, and to reduce the attenuation of the optical fiber.

Third, consideration of optical profile matching: if the pure silicon dioxide glass is used as the outer cladding material, the doping concentration of each portion is limited when the viscosity matching design is considered, while in order to ensure that the optical parameters of the optical fiber meet the parameter requirements of G.652 or G.654 optical fiber, i.e. to ensure that the MFD, dispersion and bend properties of the optical fiber meet the standard requirements, we must consider the optical profile design. This requires us to overall consider the optical design of the optical fiber when we design the viscosity, thus the difficulty in process realization is increased.

In conclusion, at present, no relevant patents disclose an optical fiber with ultra low attenuation and large effective area that has all of the following characteristics and can meet the ITU-T G.654.B or D standard requirements: 1, the core is a non-pure silica core, and is doped with germanium; 2, the core is doped with alkali metals to optimize the viscosity of the core; 3, a sunken structure exists between the core and the outer cladding to restrain the fundamental mode cutoff; and 4, the outermost glass material of the optical fiber with ultra low attenuation is silicon dioxide glass not doped with fluorine.

Therefore, a heretofore unaddressed need exists in the art to address the aforementioned deficiencies and inadequacies.

SUMMARY OF THE INVENTION

One of the objectives of the present invention is to provide a single-mode optical fiber with an ultra low attenuation and a large effective area. The single-mode optical fiber has an ultra low attenuation and a large effective area and with lower manufacturing cost, and the cable cutoff wavelength thereof is less than 1530 nm, and the optical fiber has good bend loss and dispersion properties.

In one aspect of the invention, the single-mode optical fiber includes a core layer and cladding layers. The cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The core layer has a radius $r_1$ in a range of about 4.8 to 6.5 μm, and a relative refractive index difference $\Delta n_1$ in a range of about −0.06% to 0.10%. The inner cladding layer has a radius $r_2$ in a range of about 9 to 15 μm, and a relative refractive index difference $\Delta n_2$ in a range of about −0.40% to −0.15%. The trench cladding layer has a radius $r_3$ in a range of about 12 to 17 μm, and a relative refractive index difference $\Delta n_3$ in a range of about −0.8% to −0.3%. The auxiliary outer cladding layer has a radius $r_4$ in a range of about 37 to 50 μm, and a relative refractive index difference $\Delta n_4$ in a range of about −0.6% to −0.25%. The outer cladding layer is a pure silicon dioxide glass layer.

In one embodiment, the core layer is a silicon dioxide glass layer co-doped with germanium fluorine and alkali metals, or a silicon dioxide glass layer co-doped with germanium and alkali metals, wherein a relative refractive index contribution $\Delta Ge$ of the germanium in the core layer is in a range of about 0.02% to 0.10%, and the doping quantity of the alkali metals is in a range of about 5 to 5000 ppm.

In one embodiment, the alkali metals in the core layer comprise one or more of lithium, sodium, potassium, rubidium, cesium and francium alkali metal ions.

In one embodiment, the single-mode optical fiber has an effective area at a wavelength of about 1550 nm being in a range of about 100 to 140 $\mu m^2$, preferably, in a range of about 119 to 140 $\mu m^2$.

In one embodiment, the single-mode optical fiber has a cable cutoff wavelength being equal to or less than about 1530 nm.

In one embodiment, the single-mode optical fiber has a dispersion at a wavelength of about 1550 nm being equal to or less than 23 ps/(nm*km), and the dispersion at wavelength of about 1625 nm being equal to or less than 27 ps/(nm*km).

In one embodiment, the single-mode optical fiber has an attenuation at a wavelength of about 1550 nm being equal to or less than 0.185 dB/km, preferably, equal to or less than 0.170 dB/km.

In one embodiment, the single-mode optical fiber has a microbending loss at a wavelength of about 1700 nm being equal to or less than 5 dB/km. Microbending means certain distortions whose the radius of curvature can be comparable to the cross sectional dimension of the optical fiber.

In one embodiment, the single-mode optical fiber has a macrobending loss with a bend radius of R 15 mm for 10 circles at a wavelength of 1550 nm being equal to or less than 0.25 dB, and the macrobending loss with a bend radius of R10 mm for 1 circle being equal to or less than 0.75 dB.

In one embodiment, the single-mode optical fiber has a mode field diameter (MFD) at a wavelength of about 1550 nm being about 11 to 13 μm.

Among other things, the present invention has at least the following beneficial effects.

1. The core layer is doped with germanium and alkali metals, and the viscosity matching inside the optical fiber is designed reasonably, reducing the defects in the preparation process of the optical fiber and the attenuation parameter of the optical fiber.

2. A reasonable fluorine-doped sunken structure is designed, and through the reasonable design of each fiber core profile, the optical fiber has an effective area equal to or greater than 100 $\mu m^2$, and under the condition of a better parameter scope, the effective area can be equal to or greater than 130 $\mu m^2$, and even greater than 140 $\mu m^2$.

3. The integrated performance parameters of the present invention such as the cutoff wavelength, the bend loss and the dispersion are excellent at the applied waveband, the cable cutoff wavelength is small enough to ensure the single mode condition of the optical signal of such an optical fiber in the C waveband transmission application, a multilayer step-like sunken cladding structure is used for the optical fiber profile, and a wide sunken cladding structure is used for limiting the fundamental mode leakage, which can better reduce the bend loss of the optical fiber.

4. Pure silicon dioxide is used for the outermost outer cladding layer, and the proportion of fluorine-doped glass in the optical fiber is reduced, thus the manufacturing and production costs of the optical fiber are reduced.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a diagram of a refractive-index profile structure distribution of an optical fiber according to an embodiment of the present invention.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

From a central axis of an optical fiber, according to changing of a refractive index, a layer closest to the axis is defined as a core layer, i.e., the core layer refers to a central area of a cross section of the fiber, and an outmost layer of the fiber, i.e., a pure silicon dioxide layer, is defined as an outer cladding layer of the fiber.

As used herein, a relative refractive index $\Delta n_i$ of a layer of a fiber is defined according to the following formula:

$$\Delta n_i = \frac{n_i - n_c}{n_c} \times 100\%$$

where $n_i$ is a refractive index of the corresponding layer, and $n_c$ is a refractive index of the outer cladding layer, that is, a refractive index of the pure silicon dioxide without dopants of Ge or F.

A contribution of doped Ge in the core layer of the optical fiber to the refractive index $\Delta Ge$ is defined according to the following equation:

$$\Delta Ge = \frac{n_{Ge} - n_c}{n_c} \times 100\%,$$

where $n_{Ge}$ is an absolute refractive index of the silicon dioxide glass caused by the doped substance Ge doped in the core layer, provided that the doped substance Ge doped in the core layer is doped in the pure silicon dioxide that includes no other doped substance.

An effective area of the optical fiber $A_{eff}$ is defined according to the following equation:

$$A_{eff} = 2\pi \frac{\left(\int_0^\infty E^2 r\,dr\right)^2}{\int_0^\infty E^4 r\,dr}$$

where E is the electric field related to the transmission, and r is the distance between the axial center and the distribution point of the electric field.

As defined in the IEC (International Electrotechnical Commission) standard 60793-1-44, a cable cutoff wavelength $\lambda_{cc}$ is a wavelength for which an optical signal no longer transmits as a single-mode signal after transmitting about 22 meters in a fiber. During a test, a fiber needs to be bent into a circle with a radius of about 14 cm and two circles with a radius of 4 cm to obtain data.

The microbending test is performed according to Method B provided in IEC TR 62221-2012. Because a long wavelength is more sensitive to bending, which increases in an exponential form, and the test wavelength ranges from 1250 nm to 1700 nm, so in the present invention, priority is given to investigating the microbending values at the long wavelengths. The microbending value at 1700 nm is used for measuring the microbending properties of the optical fiber of a certain design.

The description will be made as to the embodiments of the present invention in conjunction with the accompanying drawings. In accordance with the purposes of this invention, as embodied and broadly described herein, this invention, in one aspect, relates to a single-mode optical fiber having an ultra low attenuation and a large effective area.

According to one embodiment of the invention as shown in FIG. 1 the optical fiber includes a core layer and cladding layers surrounding the core layer. The core layer is a silicon dioxide glass layer co-doped with germanium fluorine and alkali metals, or a silicon dioxide glass layer co-doped with germanium and alkali metals. The alkali metals in the core layer include one or more of lithium, sodium, potassium, rubidium, cesium and francium alkali metal ions. The cladding layers have an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The outer cladding is a pure silicon dioxide glass layer, and the diameter of the outer cladding is 125 μm.

Table 1 lists parameters of the optical fiber according to the preferred embodiments of the present invention, where $\Delta Ge$ is a refractive index contribution of Ge doping in the core layer, and K is the content of potassium in the core layer. Table 2 lists optical parameter properties corresponding to the optical fiber in the Table 1.

TABLE 1

Optical parameters of the optical fiber of embodiments of the invention

| No. | R1 [μm] | Δ1 [%] | Core ΔGe [%] | K [ppm] | R2 [μm] | Δ2 [%] | R3 [μm] | Δ3 [%] | R4 [μm] | Δ4 [%] |
|---|---|---|---|---|---|---|---|---|---|---|
| 1 | 5.3 | 0.03 | 0.06 | 300 | 11.1 | −0.22 | 13.2 | −0.51 | 41 | −0.36 |
| 2 | 5.5 | 0.04 | 0.02 | 100 | 11.4 | −0.24 | 15.3 | −0.42 | 47 | −0.37 |
| 3 | 6 | 0 | 0.07 | 200 | 12.4 | −0.26 | 15.4 | −0.43 | 46 | −0.41 |
| 4 | 5.4 | 0.02 | 0.05 | 500 | 11 | −0.23 | 14.6 | −0.59 | 39 | −0.29 |
| 5 | 5.1 | 0.07 | 0.11 | 300 | 10.3 | −0.18 | 14.1 | −0.37 | 42 | −0.26 |
| 6 | 6 | 0.04 | 0.06 | 2000 | 12.9 | −0.2 | 16 | −0.54 | 40 | −0.41 |
| 7 | 5.2 | 0 | 0.07 | 50 | 10.1 | −0.25 | 12.9 | −0.52 | 47 | −0.43 |
| 8 | 5.4 | −0.05 | 0.03 | 1000 | 13 | −0.36 | 16.3 | −0.72 | 45 | −0.58 |
| 9 | 6.2 | −0.05 | 0.02 | 400 | 11.8 | −0.31 | 13.9 | −0.64 | 43 | −0.51 |
| 10 | 4.9 | −0.02 | 0.04 | 900 | 14.5 | −0.21 | 16.2 | −0.63 | 41 | −0.33 |

TABLE 2

Performance parameters of the optical fiber of embodiments of the invention

| No. | MFD @1550 nm | Aeff@ 1550 nm | Cable Cutoff | Disp @1550 nm | Disp @1625 nm | Att. @1550 nm | Micro-bending @1700 nm | R15 mm at 10turns Macro-bending loss @1550 nm | R10 mm at 1turn Macro-bending loss @1550 nm |
|---|---|---|---|---|---|---|---|---|---|
| 1 | 12.94 | 140.0 | 1432 | 21.1 | 25.6 | 0.168 | 3.2 | 0.19 | 0.53 |
| 2 | 12.71 | 132.7 | 1463 | 20.4 | 24.9 | 0.164 | 2.9 | 0.07 | 0.25 |
| 3 | 12.73 | 132.7 | 1432 | 21.3 | 25.6 | 0.166 | 3.6 | 0.21 | 0.61 |
| 4 | 11.45 | 108.5 | 1501 | 21.0 | 25.6 | 0.171 | 4.1 | 0.14 | 0.40 |
| 5 | 12.03 | 109.2 | 1453 | 21.0 | 25.6 | 0.176 | 4.0 | 0.16 | 0.45 |
| 6 | 12.70 | 128.7 | 1482 | 21.3 | 25.8 | 0.178 | 3.2 | 0.14 | 0.41 |
| 7 | 11.75 | 112.2 | 1436 | 20.9 | 25.2 | 0.174 | 4.1 | 0.20 | 0.60 |
| 8 | 11.54 | 109.2 | 1520 | 21.2 | 25.4 | 0.169 | 2.4 | 0.09 | 0.29 |
| 9 | 12.38 | 123.8 | 1386 | 21.4 | 25.8 | 0.165 | 4.3 | 0.20 | 0.70 |
| 10 | 12.6 | 127.5 | 1461 | 19.3 | 23.5 | 0.168 | 3.7 | 0.19 | 0.53 |

According to the present invention, a core/cladding section structure of the optical fiber and internal viscosity matching of the optical fiber are properly designed. Alkali metal doping is added into the core layer to optimize the core layer viscosity. The optical fiber has a relatively low attenuation coefficient and a larger effective area. The production cost is low. In addition, integrated performance parameters of the optical fiber such as the cutoff wavelength, the bend loss and the dispersion are excellent in applied wavebands.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A single-mode optical fiber with ultra low attenuation and large effective area, comprising:

a core layer and cladding layers, wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer;

wherein the core layer has a radius $r_1$ in a range of 4.8 to 6.5 μm, and a relative refractive index difference $\Delta n_1$ in a range of −0.06% to 0.10%;

wherein the inner cladding layer has a radius $r_2$ in a range of 9 to 15 μm, and a relative refractive index difference $\Delta n_2$ in a range of −0.40% to −0.15%;

wherein the trench cladding layer has a radius $r_3$ in a range of 12 to 17 μm, and a relative refractive index difference $\Delta n_3$ in a range of −0.8% to −0.3%;

wherein the auxiliary outer cladding layer has a radius $r_4$ in a range of 37 to 50 μm, and a relative refractive index difference $\Delta n_4$ in a range of −0.6% to −0.25%;

wherein the outer cladding layer is a pure silicon dioxide glass layer;

wherein the core layer is a silicon dioxide glass layer co-doped with germanium fluorine and alkali metals, or a silicon dioxide glass layer co-doped with germanium and the alkali metals, wherein a relative refractive index contribution of the germanium in the core layer is in a range of 0.02% to 0.10%, and the doping quantity of the alkali metals are in a range of 300 to 5000 ppm by mass; and wherein the alkali metals in the core layer comprise one or more of lithium, sodium, potassium, rubidium, and cesium alkali metal ions.

2. The single-mode optical fiber according to claim 1, having an effective area at a wavelength of 1550 nm being in a range of 100 to 140 μm².

3. The single-mode optical fiber according to claim 1, having a cable cutoff wavelength being equal to or less than 1530 nm.

4. The single-mode optical fiber according to claim 1, having a dispersion at a wavelength of 1550 nm being equal to or less than 23 ps/(nm*km), and the dispersion at wavelength of 1625 nm being equal to or less than 27 ps/(nm*km).

5. The single-mode optical fiber according to claim 1, having an attenuation at a wavelength of 1550 nm being equal to or less than 0.185 dB/km.

6. The single-mode optical fiber according to claim 1, having a microbending loss at a wavelength of 1700 nm being equal to or less than 5 dB/km.

7. The single-mode optical fiber according to claim 1, having an macrobending loss with a bend radius of R 15 mm for 10 circles at a wavelength of 1550 nm being equal to or less than 0.25 dB, and the macrobending loss with a bend radius of R10 mm for 1 circle being equal to or less than 0.75 dB.

8. The single-mode optical fiber according to claim 1, having a mode field diameter at a wavelength of 1550 nm being 11 to 13 μm.

* * * * *